United States Patent

[11] 3,589,164

[72] Inventor Orville J. Constant
 Hammond, Ind.
[21] Appl. No. 806,209
[22] Filed Mar. 11, 1969
[45] Patented June 29, 1971
[73] Assignee Verson Allsteel Press Company
 Chicago, Ill.

[54] METHOD AND APPARATUS FOR EXTRUDING DOUBLE-ENDED METAL EXTRUSIONS
 20 Claims, 13 Drawing Figs.

[52] U.S. Cl. ................................................. 72/354
[51] Int. Cl. ........................................... B21d 43/00
[50] Field of Search .................................... 72/343,
 344, 345, 352, 353, 354, 358, 361; 10/86 F

[56] References Cited
UNITED STATES PATENTS

| | | | |
|---|---|---|---|
| 3,079,682 | 3/1963 | Bailey | 72/354 |
| 3,096,579 | 7/1963 | Waller | 72/354 |
| 3,108,502 | 10/1963 | Chatfield | 72/343 |
| 3,176,895 | 2/1965 | Bailey | 72/354 |
| 3,138,257 | 6/1964 | Andersen | 72/354 |

*Primary Examiner*—Richard J. Herbst
*Attorney*—Wallenstein, Spangenberg, Hattis & Strampel ABSTRACT: One end of a solid metal part is engaged with the end of a fixed extrusion punch, the sides of the part are encompassed by the cavity of a movable die, the other end of the part is engaged with the end of a movable punch which is also movable with respect to the movable die, and the movable die and the movable punch are moved toward the fixed punch for extruding the part in the cavity in the die to shape the sides of the part and for forwardly extruding the part over the fixed punch and rearwardly extruding the part over the movable punch to shape recesses in the ends of the part. The movable die and the movable punch are carried by the ram of a press and the fixed punch is carried by the bed of the press below the feed level of the press along which the part is fed. As the part is extruded, it and the movable die are moved below the feed level of the press, and when the extrusion of the part is completed, the part is raised to the feed level of the press. Parts to be extruded are supplied to the feed level of the press and fed therealong by feeding means to the aforesaid extruding apparatus, and after the parts are extruded, they are fed along the feed level of the press by the feeding means to a station where the web between the recesses therein is pierced. Thereafter, the feeding means feeds the extruded and pierced parts along the feed level of the press to a point of discharge from the press.

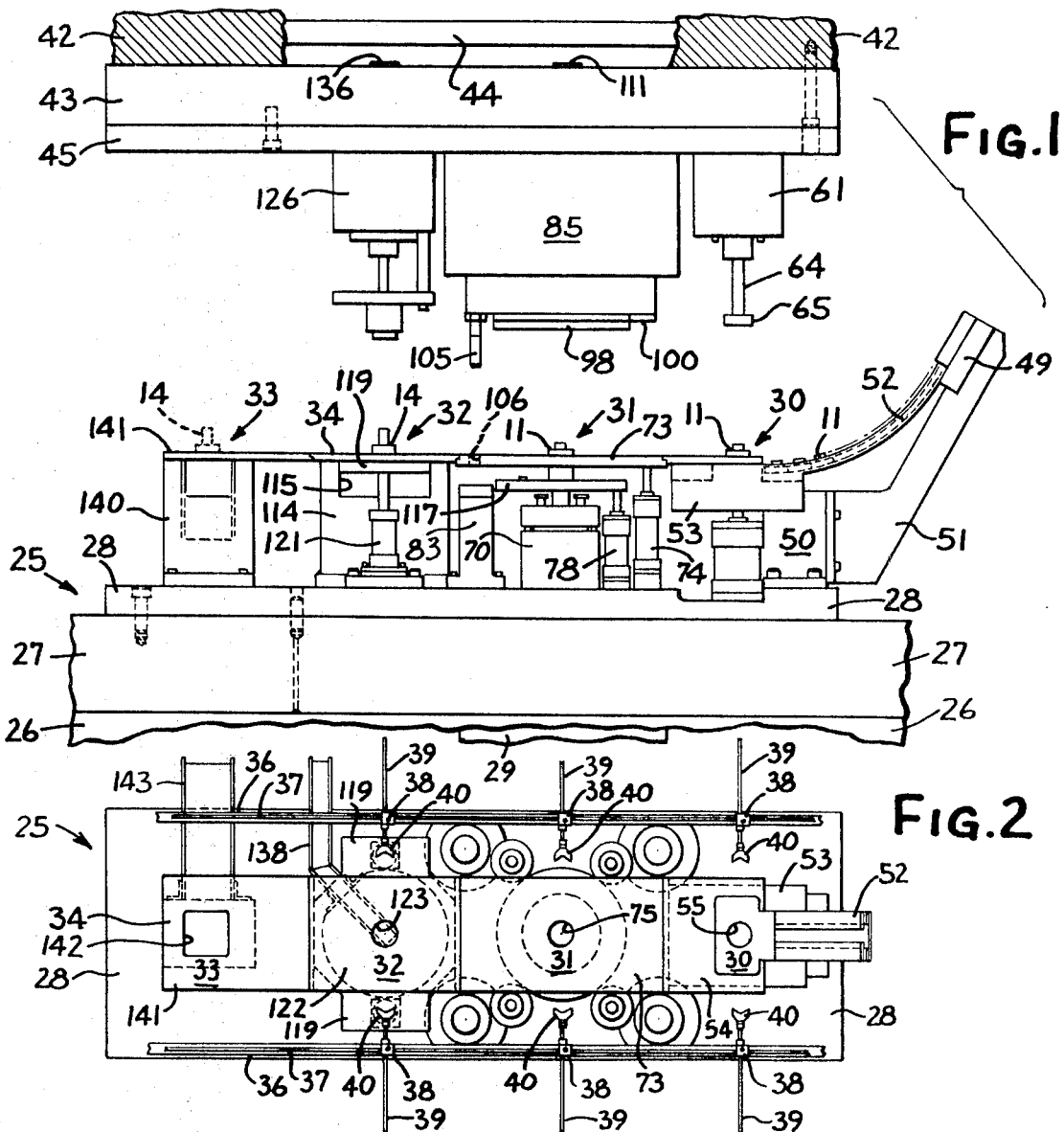
FIG.1
FIG.2
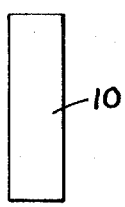
FIG.3
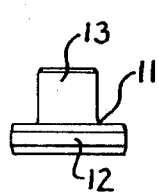
FIG.4
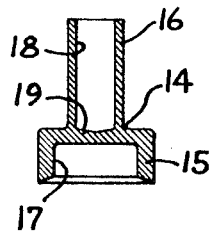
FIG.5
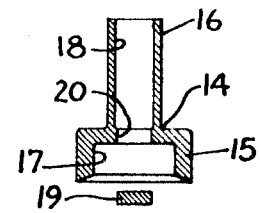
FIG.6
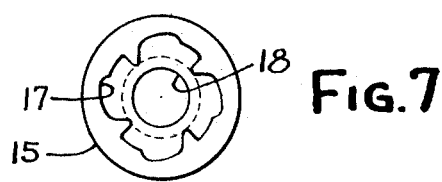
FIG.7
INVENTOR
ORVILLE J. CONSTANT
by: Wallenstein, Spangenberg,
Hattis & Strampel
ATTYS.

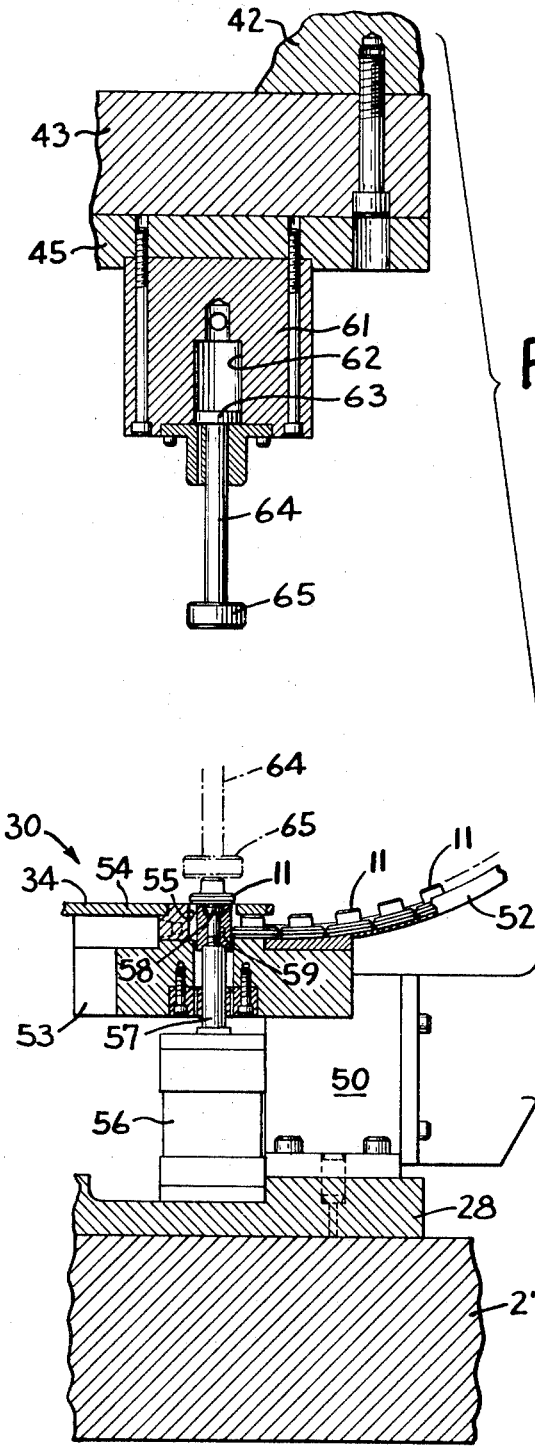
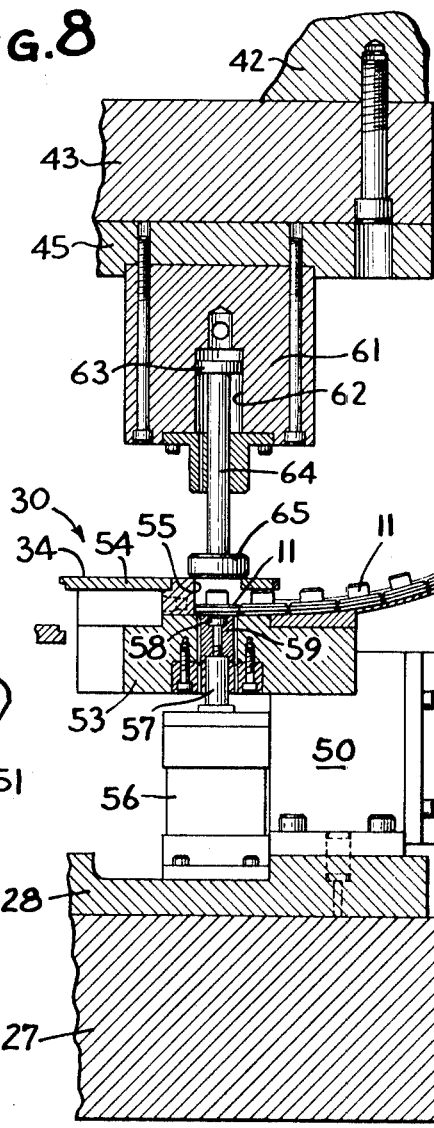

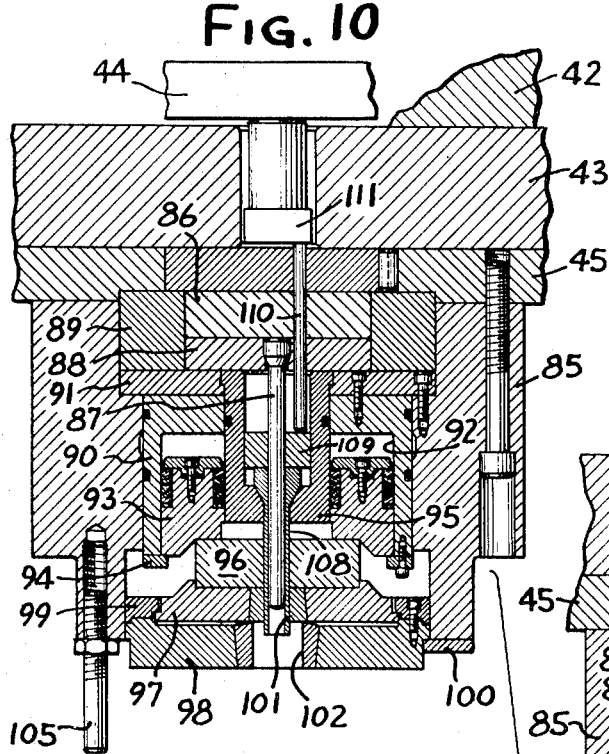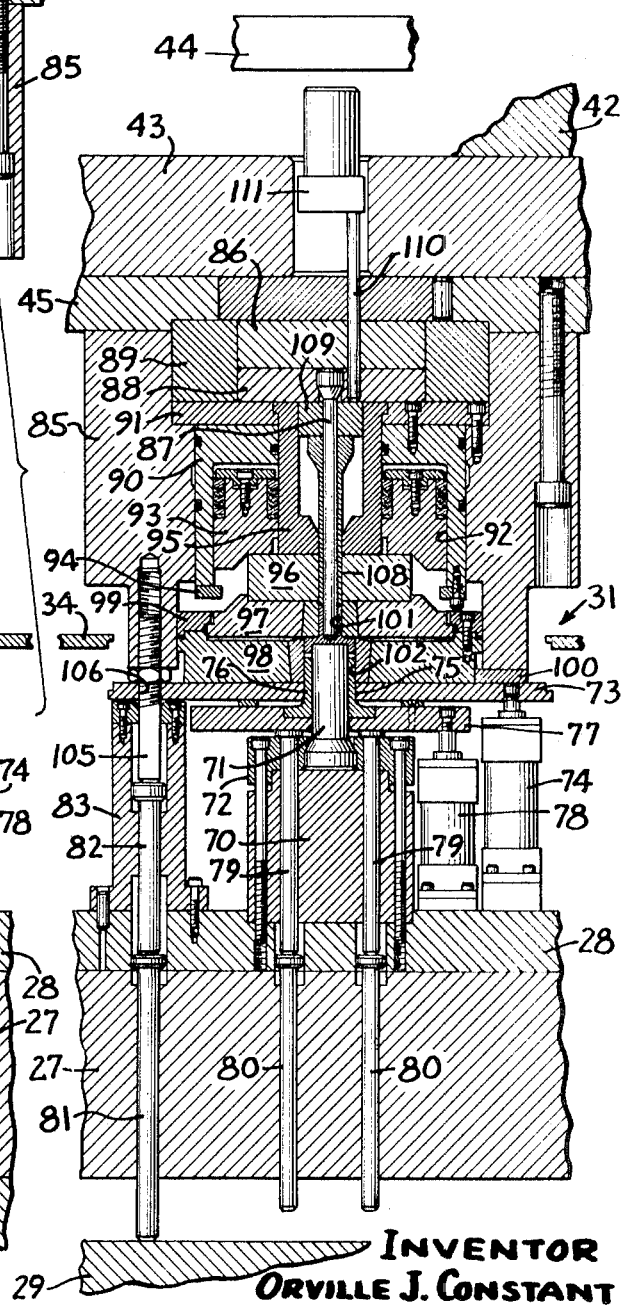

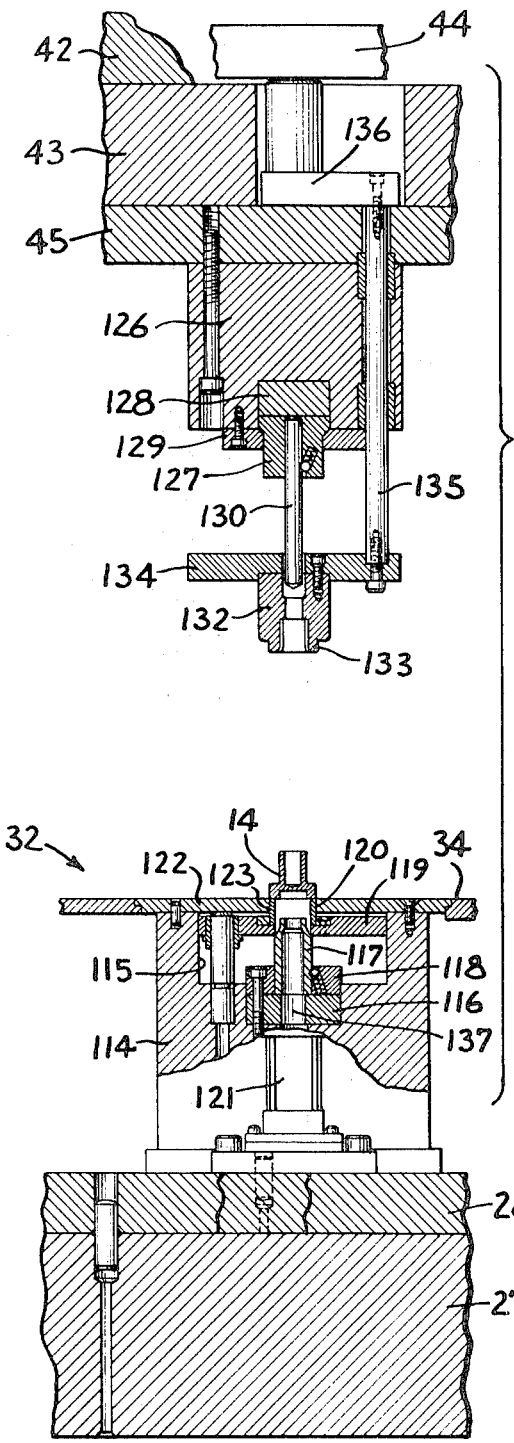
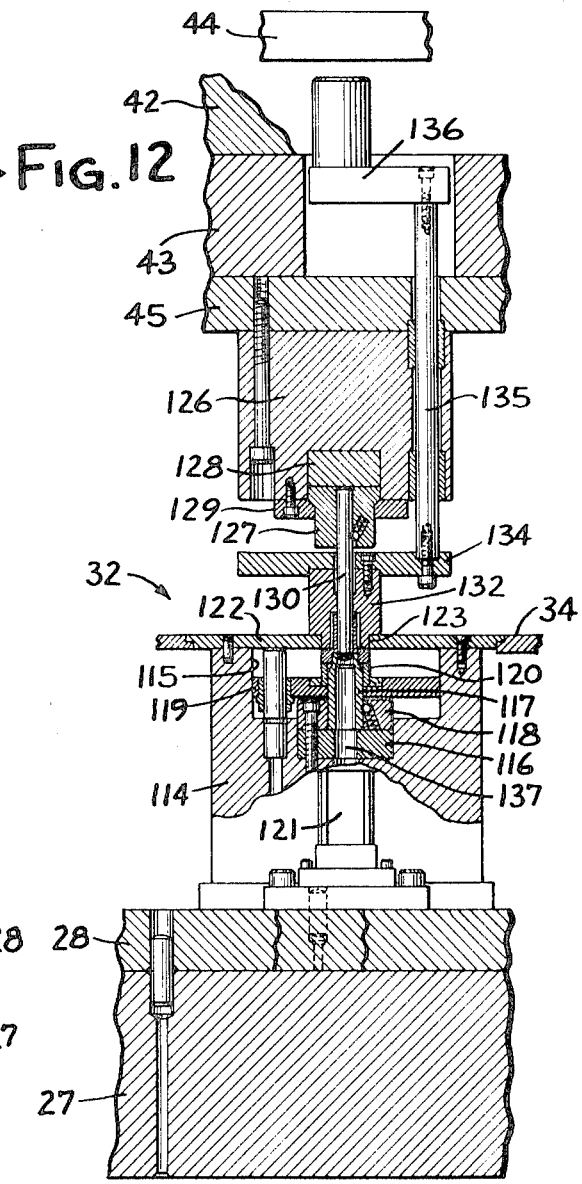

3,589,164

METHOD AND APPARATUS FOR EXTRUDING DOUBLE-ENDED METAL EXTRUSIONS

The principal object of this invention is to provide a new and improved method and apparatus for extruding double-ended metal extrusions. The extruding of the part may be accomplished in a press having a bed, a ram and a part feed level between the bed and the ram.

Briefly, in accordance with this invention, a fixed extrusion punch is carried by the bed of the press below the part feed level thereof, a movable extrusion punch is fixedly carried by the ram of the press in longitudinal alignment with the fixed punch, a movable die is carried by the ram of the press and is movable with respect to the ram and has a die cavity in longitudinal alignment with said fixed and movable punches, and a lost motion pressure means normally maintains the die in a downward position with respect to the movable punch. Feeding means, including a retractable pad at the feed level of the press, feeds a solid metal part along the feed level of the press to a position where the part is in alignment with the die cavity, where one end of the part is above the fixed punch and where the other end of the part is below the movable punch. As the ram is lowered, the die engages the retractable pad and encompasses the sides of the part to lower the pad and the part below the feed level of the press, the part is extruded in the cavity of the die to shape the sides of the part, and said one end of the part is forwardly extruded over the fixed punch and said other end of the part is rearwardly extruded over the movable punch to shape recesses in the ends of the part. The lost motion pressure means permits downward movement of the movable punch with respect to the die to provide the rearward extrusion of said other end of the part over the movable punch.

The feeding means feeds the parts one at a time along the part feed level from a feed station in the press, and after the parts are extruded as aforesaid at the extruding station of the press, the feeding means feeds the extruded parts along the feed level of the press one at a time to a piercing station in the press. When the parts are extruded as aforesaid, they have a web between the recesses in the ends of the parts, and these webs are pierced at the piercing station. The feeding means further feeds the extruded and pierced parts along the feed level of the press one at a time from the piercing station to a discharge station in the press.

While the method and apparatus of this invention are applicable to extruding double-ended extrusions which are substantially symmetrical, they are particularly applicable to such extrusions which are not symmetrical, as for example, extruding a part having at one end a head portion of relatively large transverse dimension and at the other end a tail portion of relatively small transverse dimension, such as, would be present in a starter barrel for automotive starters or the like.

Other objects of this invention reside in the method steps used in the aforementioned extruding and/or piercing of the metal parts and in the cooperative relationships therebetween, and also in the details of the apparatus and the cooperative relationships between the component parts thereof used in the aforementioned extruding and/or piercing of the metal parts.

Other objects and advantages of this invention will become apparent to those skilled in the art upon reference to the accompanying specification, claims and drawings in which:

FIG. 1 is a partial schematic front elevational view of a press for performing the aforementioned double-ended extrusion of the metal part, the tooling carried by the bed and the ram of the press being illustrated;

FIG. 2 is a top plan view of the tooling carried by the bed of the press;

FIGS. 3, 4, 5, 6 and 7 are views of the metal part showing the progressive steps in forming the ultimate part, FIG. 7 being a bottom plan view of the part illustrated in FIG. 6;

FIGS. 8 and 9 are vertical sectional views through the tooling illustrating the feed station generally designated at 30 in FIGS. 1 and 2, FIG. 8 showing the ram in its upper position and FIG. 9 showing the ram in its lowered position;

FIGS. 10 and 11 are vertical sectional views through the extruding station generally designated at 31 in FIGS. 1 and 2, FIG. 10 illustrating the ram in its upper position and FIG. 11 illustrating the ram in its lowered position; and FIGS. 12 and 13 are vertical sectional views through the tooling at the pierce station generally designated at 32 in FIGS. 1 and 2, FIG. 12 showing the ram in its raised position and FIG. 13 showing the ram in its lowered position.

For purposes of illustration herein, the method and apparatus of this invention will be described in connection with producing a double-ended extruded metal part having a head portion of relatively large transverse dimension and a tail portion of relatively small transverse dimension as would be the case for a starter barrel for automotive starters or the like. The progressive steps in the production of such a part are illustrated in FIGS. 3 to 7. Here, cold drawn round bar stock of A.I.S.I. 86020 steel or the equivalent having a diameter of about 0.818 inch may be utilized. Predetermined lengths are sheared from the bar stock by a shearing operation, and a predetermined length of such bar stock is illustrated at 10 in FIG. 3. As a specific example, it may have a length of about 2.62 inch and a weight of about 180 grams.

The sheared lengths 10 of the bar stock are then subjected to a first annealing step. As a specific example, they may be heated to 1,330° F. plus or minus 15° F. for 5 hours and then cooled to about 800° F. at a rate not to exceed 300° F. per hour. The sheared lengths 10 of the bar stock are then coated with a suitable lubricant including an oil such as Lube Macco 51D0 to assist in the subsequent forming and extruding operation. The length 10 of the lubricant coated sheared cylindrical bar stock is then extruded in a die structure into the part 11 illustrated in FIG. 4, the part 11 having a head portion 12 and a tail portion 13. As a specific example, the total length of the part 11 may be about 1.23 inch and the length of the head portion 12 may be about 0.46 inch. The diameter of the head portion 12 may be about 1.688 inch and the diameter of the tail portion 13 may be about 0.820 inch. The particular die structure for extruding the part 11 is not disclosed herein inasmuch as it does not constitute a part of the instant invention, it being pointed out that any suitable die structure for forming the part 11 may be utilized.

The extruded part 11 is then cleaned to remove grease and oil therefrom and this may be accomplished by steam cleaning or by immersing the parts in a caustic soda alkali bath for a period of about 5 to 7 minutes at a temperature of 190° F. to 200° F. and then rinsed in cold water to remove all alkali therefrom. The cleaned parts 11 are then subjected to a second annealing step. As a specific example, they may be heated to 1,330° F. plus or minus 15° F. for 5 hours and then cooled to about 800° F. at a rate not to exceed 300° F. per hour. The cleaned and annealed parts 11 are then immersed in a Bonderite zinc phosphate containing coating bath at 175° F. to 185° F. for 5 to 7 minutes to provide the same with a zinc phosphate coating, after which they are rinsed in cold water and immersed in a Parcolene neutralizing rinse at 140 ° F. to 145° F. for 5 to 7 minutes to neutralize any possible residual acidity and to leave the zinc phosphate coating in an ideal condition for the application of a soap lubricant. Next, they are immersed in a Bonderlube soap containing bath at 140° F. to 145° F. for 5 to 7 minutes, the soap being absorbed into the zinc phosphate coating to form a particularly desirable lubricant layer or coating for the subsequent forming and extrusion operations.

The annealed and lubricant coated parts 11 are then supplied from a hopper to a feed station generally designated at 30 in FIGS. 1 and 2 and shown in more detail at 30 in FIGS. 8 and 9 where they are fed one at a time to the feed level 34 of the press 25 illustrated in FIGS. 1 and 2. The parts are then advanced by a feeding means to the extrusion station generally designated at 31 in FIGS. 1 and 2 and shown in more detail in FIGS. 10 and 11.

Here, the part 11 is double-ended extruded into the part 14 illustrated in FIG. 5, the part 14 having a head portion 15, a tail portion 16 with the head portion 15 having a recess 17 therein and the tail portion 16 having a recess 18 therein. The recesses 17 and 18 are separated by a web 19. The double-ended extruded part 14 may have a total length of about 2.24 inch with the head portion having a length of about .72 inch. The head portion 15 may have an outside diameter of 1.693 inch and the tail portion may have an outside diameter of 0.822 inch. The recess 18 in the tail portion 16 may have an internal diameter of about 0.590 inch and the recess 17 in the head portion 15 may have a configuration such as that illustrated in FIG. 7. With respect to the configuration of the recess 17 in the head portion 15, it may be provided with a plurality of shoulders and cam surfaces which make the part 14 particularly suitable for use as a starter barrel in an automotive starter. The thickness of the web 19 between the recesses 17 and 18 may be about 0.24 inch.

After the part 14 is so double extruded, it is transferred from the extrude station 31 to a piercing station 32 in the press as illustrated in FIGS. 1 and 2 and FIGS. 12 and 13 and the web 19 is pierced therefrom to form a passage between the recesses 17 and 18 as illustrated in FIG. 6. The web 19 pierced therefrom is in the form of a slug as illustrated in FIG. 6 and this comprises scrap metal. The hole 20 formed by the piercing of the slug 19 therefrom may have a diameter of about 0.58 inch.

The double-ended extruded and pierced part 14 is then fed from the piercing station 32 to a discharge station 33 of the press 25 as shown in FIGS. 1 and 2.

Referring now to FIGS. 1 and 2, there is diagrammatically illustrated a portion of a press generally designated at 25 for extruding the part 11 of FIG. 4 into the part 14 of FIG. 5 and for piercing the part 14 as illustrated in FIG. 6. Here, the press 25 includes a bed partially shown at 26 having a bolster plate 27. A lower die shoe 28 is carried by the bolster plate 27 and this die shoe carries the tooling and parts for the feed station 30, the extrude station 31, the piercing station 32 and the discharge station 33. The bed 26 is also provided with a conventional cushion 29 which is operably associated with the extrude station 31. The tooling and parts for the various stations which are supported by the bed have a feed level 34 along which the parts are fed along the press from station to station.

Longitudinally movably carried by the die shoe 28 on opposite sides of the tooling carried by the die shoe is a pair of bars 36 forming a part of a feed means for feeding parts along the feed level 34. A plurality of housings 38 are carried by the bars 36 and these housings are provided with pinions therein. A pair of longitudinally movable racks 37 extend through the housings 38 and engage the pinions therein. The pinions in the housings 38 also engage a plurality of rack bars 39 extending through the housing 38 and provided at their inner ends with fingers 40. As the rack bars 37 are reciprocated, the rack bars 39 and, hence, the fingers 40 are advanced toward each other or retracted depending upon the direction of movement of the rack bars 37. The fingers 40 are for the purpose of gripping and releasing the parts at the various stations 30, 31, 32 and 33. With the parts in the position shown in FIG. 2, the fingers 40 are disengaged from the parts on the feed level 34 of the press. When the bars 36 are manipulated, the fingers 40 are manipulated to engage the parts and then the bars 36 are longitudinally moved to move the parts progressively from the stations 30, 31 and 32 to the station 33. When the parts are so moved, the rack bars 36 are operated to retract the fingers 40 to release the parts at the stations to which they have been moved. The bars 36 are then moved back to the original position where the next feeding cycle may take place. The bars 36 and the rack bars 37 are operated by a mechanism (not shown) in timed relation to the reciprocation of the ram of the press 25. Generally speaking, the parts are engaged and moved by the fingers 40 during the upstroke of the press ram. In this way, the parts are moved one at a time along the feed level 34 of the press.

The ram of the press is partially and diagrammatically illustrated at 4, the ram being reciprocated between an up position and a down position by cranks or the like in the case of a mechanical press. The ram 42 is provided with a filler block 43 which in turn carries an upper die shoe 45. The die shoe 45 carries the tooling for the stations 30, 31 and 32 of the press. The ram 42 is also provided with a knockout device which may comprise a bar 44 operated in timed relation with the reciprocation of the ram. This bar 44 may be operated by pneumatic cylinders or the like (not shown).

Referring now more particularly to FIGS. 1, 2, 8 and 9, the feed station 30 includes a support 50 carried by the lower die shoe 38 to which is secured an extension bracket 51. The upper end of the bracket 51 carries a track head 49 for receiving parts 11 from a hopper and supplying the parts to a chute 52 extending to a block 53 for feeding parts 11 thereto. The block 53 carries a plate 54 which forms a portion of the feed level 34 of the press and which is provided with a central hole 55 through which parts 11 are elevated from the block 53 to the feed level surface 34. A pneumatic cylinder 56 is carried by the lower die shoe 28 in alignment with the hole 55. The cylinder 56 carries a piston having a piston rod 57 extending therefrom which in turn carries a lift-out block 59 by means of a screw 58. The block 59 is normally below the parts 11 fed by the track 52 and is adapted to be operated by the pneumatic cylinder 56 to elevate the parts 11 one at a time through the hole 55 in the plate 54 in alignment with the feed level 34 of the press.

The feed station 30 also includes a block 61 carried by the upper die shoe 45 and, hence, the ram 42, this block having a cylinder 62 therein for containing a piston 63 which is connected by a piston rod 64 to a punch head 65. Air pressure is supplied to the cylinder 62 behind the piston 63 for normally urging the piston 63 and punch head 65 downwardly as illustrated in FIG. 8.

When the ram 42 is in the lowered position as illustrated in 52 FIG. 9, the punch head 65 engages the plate 54 and is retracted with respect to the block 61 against the air pressure supplied against the piston 63 in the cylinder 62. At the same time, the lift-out block 59 is in the down position so that a part 11 is supplied thereover from the track 52. As the ram 42 is raised, the cylinder 56 is supplied with air pressure to raise the block 59 to cause it to lift a part 11 through the hole 55 in the plate 54 to a position illustrated in FIG. 8. Since the punch head is pneumatically biased downwardly, the part 11 is pinched between the lift-out block 59 and the punch head 65 as shown in broken lines in FIG. 8. While the part 11 is so pinched it is gripped by the fingers 40 of the feed mechanism and as the ram 42 continues its upward movement, the punch head 65 is then drawn away from the part 11 so as to free the part 11 which is then engaged by the fingers 40. Thereafter, the pressure in the cylinder 56 is exhausted so that the lift-out block 59 is retracted to allow another part 11 to be fed thereover for the next cycle of operation. The fingers 40 of the feed mechanism then feed the part 11 to the extrude station 31 illustrated in FIGS. 1, 2, 10 and 11. FIG. 10 illustrates the part 11 having been so fed to the extrude station 31 with the ram in the up position.

The extrude station 31 includes a block 70 carried by the lower die shoe 28 and, hence, by the bed 26 through the bolster 27. The block 70 which acts as an anvil fixedly carries a lower punch 71 which is held in place by a ring 72. The upper end of the lower fixed punch 71 is arranged below the feed level 34 of the press. A movable pad 73 is normally held in its upper position by a pneumatic cylinder 74 which is continuously supplied with air under pressure, the pad 73 in its upper position forming a continuation of the feed level 34 of the press. The pad 73 has an opening 75 therein which receives a sleeve 76 surrounding the lower punch 71 and which is carried by a lifter plate 77. The lifter plate 77 is raised and lowered by a pressure cylinder 78. In its upper position, as illustrated in FIG. 10, the sleeve 76 acts as a continuation of the feed level 34 of the press for receiving the part 11 as the part is fed thereto by the feed means. However, as soon as the part 11 reaches the position over the lower fixed punch 71, the cylinder 78 is operated to lower the lift-out plate 77 against the ends of pins 79 so that opening 75 in the movable pad forms a pocket into which the part 11 drops against the upper end of the fixed punch 71. In this way, the part 11 is accurately positioned on the top of the fixed punch 71 when the part 11 is released by the fingers 40 of the feed means. The pins 79 engage pins 80 extending through the bolster 27 to the cushion 29 of the press. The cushion 29 of the press is controlled by timing pins 81 and 82 extending through the bolster 27, the lower die shoe 28 and a pin guide 83 carried by the lower die shoe 28. The movable pad 73 is provided with an opening 106 in alignment with the timing pins 81 and 82.

A block 85 is secured to the upper die shoe 45 and, hence, to the movable ram 42 and it encompasses an anvil 86 which is abutted by an upper movable punch 87 held in place thereagainst by a plate 88 and a ring 89. A cylinder block 90 is held in place in the block 85 by a plate 91 and the cylinder block 90 is provided with a cylinder 92 which carries an annular piston 93, the downward movement of the annular piston 93 being limited by a ring stop 94. Also held in place by the plate 91 is a second cylinder block 95 which is adapted to be engaged by a block 96 when the piston 93 is retracted in an upward direction. A die assembly including an upper die 97 and a lower die 98 held together by a ring 99 engages the block 96, the dies 97 and 98 having inserts forming a cavity 101 of relatively small transverse dimension and a cavity 102 of relatively large transverse dimension. The die assembly is movably carried in the block 85 and the downward movement of the die assembly with respect to the block 85 is limited by a ring 100. The block 85 also adjustably carries a pin 105 which is adapted to extend through the opening 106 in the movable pad 73 for depressing the timing pins 81 and 82 and, hence, the cushion 29 of the press when the ram 42 is lowered from the raised position illustrated in FIG. 10 to the lowered position illustrated in FIG. 11. A stripper sleeve 108 backed by a block 109 surrounds the movable punch 87 and extends downwardly into the die assembly as illustrated in FIG. 10. Stripper pins 110 extend between the block 109 and a member 111 engageable with the stripper bar 44 in the ram 42 of the press. When the bar 44 is lowered, it operates through the stripper pins 110 and block 109 to move the stripper sleeve 108 downwardly as illustrated in FIG. 10. When the bar 44 is raised, the stripper sleeve 108 is allowed to raise as illustrated in FIG. 11.

With the parts in the position illustrated in FIG. 10, the part 11 is resting on the upper end of the sleeve 76 and the stripper sleeve 108 is in its down position as a result of the bar 44 engaging the member. The cylinder 78 is operated to lower the lifter plate 77 against the lifter pins 79 and, hence, to lower the lift-out sleeve 76 below the feed level 34 of the press so as to receive the part 11 on the top of the fixed punch 71 and the lift-out sleeve 76 in the opening 75 in the pad 73 when the part 11 is released by the fingers 40 of the feed means of the press. In this way, the part 11 is accurately positioned in the opening 75 upon release by the fingers 40. The bar 44 in the ram 42 is also raised to permit the stripper sleeve 108 to be retracted. As the ram 42 moves downwardly, the adjustable pin 105 passes through the hole 106 in the movable pad 73 and engages the top of the timing pin 82. The die 98 of the die assembly engages the movable pad 73 to move the same downwardly at about the same time that the pin 105 engages the timing pin 82. As the downward movement of the ram 42 progresses, the timing pins 81 and 82 lower the cushion 29 to allow the lifter pins 79 and 80 to lower and, hence, to allow the lift-out sleeve 76 to lower. The lowering of the movable pad 73 by the die assembly is against the resilient action of the cylinder 74. Thus, as the die assembly is lowered, the cavities 101 and 102 in the dies 97 and 98 encompass the tail and head portions, respectively, of the part 11 which is resting on the fixed punch 71. As the part 11 is being so encompassed, the stripper sleeve 108 is forced back by the tail portion of the part 11 at least up to the end of the movable punch 87, it being permitted to do so because the stripper bar 44 in the ram 42 is raised. At this point, then, the part 11 is wholly encased in the cavities in the die assembly, the head portion of the part 11 is engaging the fixed punch 71 and the tail portion of the part 11 is engaged by the movable punch.

As the downward movement of the ram 42 continues further, the part 11 is extruded in the die cavities 101 and 102 to shape the sides of the part and the extrusion of the head portion of the part 11 begins with the end of the head portion being forwardly extruded over the fixed punch 71 in the die cavity 102. During this forward extrusion of the head portion of the part 11 the die assembly having the cavities 101 and 102 is held down by the pressure in the hydraulic cylinder 92 acting against the annular piston 93 as the head portion of the part 11 is being so forwardly extruded over the fixed punch 71. The rearward extrusion of the tail portion over the movable punch 87 is determined by the pressure setting of the hydraulic cylinder 92. Normally the extrusion of the head portion of the part starts first. During the extrusion operation the pressure on the hydraulic cylinder 92 is overcome and the rearward extrusion of the tail portion of the part 11 is performed in the die cavity 101 over the movable punch 87. The rearward extrusion of the tail portion is provided by the movable punch 87 moving with respect to the dies 97 and 98 which motion is permitted by the overcoming of the hydraulic pressure in the hydraulic cylinder 92. At the bottom of the stroke of the ram 42 as illustrated in FIG. 11, the block or pad 96 bottoms against the cylinder block 95 and the stripper sleeve 108 also bottoms against the plate 88. This bottoming fixes the extent of the rearward extrusion of the tail section and any excess material that may be present in the part 11 appears in the head portion of the part 11. In this way, the part 11 is doubled-ended extruded into the part 14 as illustrated in FIG. 5. The punches 71 and 87 may have any desired cross-sectional configuration and in the specific example used by way of illustration herein the movable punch 87 may have a circular configuration while the fixed punch 71 may have an irregular configuration to provide the shoulders and cams illustrated in FIG. 7.

As the ram moves up from the position illustrated in FIG. 11 to the position illustrated in FIG. 10, the dies 97 and 98 are held down by the annular piston 93 of the hydraulic cylinder 92 to hold the die assembly against the movable pad 73 in the lower position while the movable punch 87 moves upwardly. By this upward movement of the movable punch 87 with respect to the die cavity 101 the extruded tail portion of the part is partially stripped from the movable punch 87. As the ram 42 continues to move upwardly, the die assembly 97, 98 is then lifted by the ring 100 on the block 87 and the movable pad 73 follows the die assembly upwardly, this following motion being afforded by the pressure in the pneumatic cylinder 74. At the same time, the cushion 29 operates through the lifter pins 79 and 80 to raise the lift-out sleeve 76 to strip the double-ended extruded part from the fixed punch 71 should the part stick to that punch. When the movable pad 73 reaches its upper position at the time that the die assembly 97, 98 begins to move away from the movable pad 73, the stripper bar 44 is lowered to push down the pins 111 and 110 and, hence, the stripper sleeve 108 to eject the extruded part from the die cavities 101 and 102. At the same time that the stripper bar 44 is operated, the cylinder 78 is operated to lift the lift-out plate and, hence, the lift-out sleeve 76 up to the feed level 34 of the press so that the extruded part 14 rests on the sleeve 76 at the feed level 34 while it is still substantially within the confines of the die cavity 102. Thus, the extruded part 11 is accurately positioned at the feed level 34 of the press as the ram continues moving upwardly so as to be accurately gripped by the fingers 40 of the feed mechanism when they are brought into contact with the extruded part 14. The extruded part 14 is then transferred by the feeding means to the piercing station generally designated at 32 in FIGS. 1, 2, 12 and 13.

Referring now more particularly to FIGS. 12 and 13, the piercing station generally designated at 32 includes a block 114 carried by the lower die shoe 28. The block 114 has an opening 115. An annular anvil 116 is carried by the block 114 and backs a button 117 held in place by a ring 118. A pad 119 is movably mounted in the opening 115 and is normally held in an upper position by a pair of air cylinders 121. The pad 119 carries a lift-out sleeve 120, the top of which is flush with the feed level 34 of the press when the pad 119 is in the raised position. The sleeve 120 is adapted to extend through a hole 123 in a plate 122 carried by the block 114 and in alignment with the feed level 34 of the press.

A block 126 is carried by the upper die shoe 45 and, hence, by the ram 42 and it is provided with a punch holder 127 backed by an anvil 128, the punch holder 127 and the anvil 128 being held in place in the block 126 by a ring 129. The punch holder 127 carries a downwardly extending piercing punch 130 which is guided by a stripper body 132 carried by a plate 134. The stripper body 132 has an extension 133 which is adapted to be received in the hole 123 in the plate 122. The plate 134 is carried by pins 135 connected to a stripper assembly 136 which is adapted to be engaged by the stripper bar 44 in the ram 42. The annular anvil 116 is provided with an opening 137 which in turn communicates with a discharge chute 138 for receiving and discharging the slugs 19 (as illustrated in FIG. 6) which are pierced from the web between the recesses 17 and 18 in the extruded part.

With the parts in the position illustrated in FIG. 12, the ram 42 is in its upper position and the stripper body 132 is in its lowered position with respect to the piercing punch 130, and the extruded part 14 is resting on the lifter sleeve 120. The cylinders 121 are energized to lower the lifter sleeve 120 to the position illustrated in FIG. 13 so as to drop the extruded part 14 over the button 117 when the extruded part 14 is released by the fingers 40 of the feeding means. The stripper bar 44 in the ram 42 is raised to allow the stripper body 132 to be raised when this is required. As the ram 42 is lowered, the extension 133 of the stripper body 132 enters the opening 123 in the plate 122 so as to be guided thereby. The stripper body 132 is provided with a recess in the end thereof which conforms to the tail portion of the extruded body 14 and the upper end of the button 117 has a configuration for receiving the recess in the head portion of the part 14. Thus, when the stripper body 132 reaches the position illustrated in FIG. 13, the extruded part 14 is closely confined in the stripper body 132 and about the button 117. As the ram 42 continues to lower, the piercing punch 130 travels through the stripper body 132 to pierce the web 19 of the extruded part, the movement of the piercing punch 130 with respect to the stripper body 132 being permitted because of the raised position of the stripper bar 44 in the ram 42. The pierced slug 19 drops through the button 117 and the hole 137 in the anvil 116 into the discharge chute 138 illustrated in FIG. 2. FIG. 13 illustrates the ram in its completely lowered position following the piercing operation.

When the ram 42 is raised from the position shown in FIG. 13, the cylinders 121 are operated to raise the lifter sleeve 120 to lift the extruded and pierced part 14 to the feed level 34 of the press. The stripper bar 44 is also operated to hold the stripper body 132 downwardly so that the part 14 is stripped from the piercing punch 130. As a result, the extruded and pierced part 14 is supported by the lifter sleeve 120 at the feed level 34 of the press so as to be gripped by the fingers 40 of the feeding means to feed the extruded and pierced part 14 to the discharge station 33 of the press. The ram continues to its completely raised position for a repeat of the piercing cycle with respect to the next extruded part to be pierced.

The discharge station as shown in FIGS. 1 and 2 includes a block 140 carried by the lower die shoe 28 which is provided at its top with a plate 141 in alignment with the feed level 34 of the press. The plate 141 is provided with an opening 142 communicating through the block with a discharge chute 143. When the extruded and pierced part 14 is moved above the opening 142 in the plate 141, the fingers 40 of the feeding means are retracted and the extruded and pierced part 14 is dropped through the opening 142 and the chute 143 to a point of discharge.

While for purposes of illustration, one form of this invention has been disclosed, other forms thereof may become apparent to those skilled in the art upon reference to this disclosure and, therefore, this invention is to be limited only by the scope of the appended claims.

What I claim is:

1. An apparatus for use in a press for extruding a double-ended metal extrusion wherein the press has a bed, a ram and a part feed level between the bed and the ram, comprising, a fixed extrusion punch carried by the bed of the press below the part feed level thereof, a movable extrusion punch fixedly carried by the ram of the press in longitudinal alignment with the fixed punch, a movable die carried by the ram of the press and movable with respect to said ram and having a die cavity in longitudinal alignment with said fixed and movable punches, lost motion pressure means for normally maintaining the die in a downward position with respect to the movable punch, means including a retractable pad at the feed level of the press and having an opening therethrough for feeding a solid metal part along the feed level of the press to a position where the part is in alignment with the die cavity, where one end of the part is above the fixed punch and the other end of the part is below the movable punch, the apparatus being such that as the ram is lowered, the die engages the retractable pad and encompasses the sides of the part to lower the pad and the part below the feed level of the press, the part is extruded in the cavity of the die to shape the sides of the part, and said one end of the part is forwardly extruded over the fixed punch and said other end of the part is rearwardly extruded over the movable punch to shape recesses in the ends of the part, said lost motion pressure means permitting downward movement of the movable punch with respect to the die to provide the rearward extrusion of said other end of the part over the movable punch.

2. An apparatus for use in a press for extruding a double-ended metal extrusion from a solid metal part having at one end a head portion of relatively large transverse dimension and at the other end a tail portion of relatively small transverse dimension, and wherein the press has a bed, a ram and a part feed level between the bed and the ram, comprising, a fixed extrusion punch carried by the bed of the press below the part feed level thereof, a movable extrusion punch fixedly carried by the ram of the press in longitudinal alignment with the fixed punch, a movable die carried by the ram of the press and movable with respect to said ram and having a die cavity in longitudinal alignment with said fixed and movable punches, said die cavity having a lower cavity portion of relatively large transverse dimensions and an upper cavity portion of relatively small transverse dimensions, lost motion pressure means for normally maintaining the die in a downward position with respect to the movable punch, means including a retractable pad having an opening therethrough for feeding said solid metal part with the head portion thereof downwardly along the feed level of the press to a position where the part is in alignment with the die cavity, where the lower head portion of the part is above the fixed punch and the upper tail portion of the part is below the movable punch, the apparatus being such that as the ram is lowered, the die engages the retractable pad and encompasses the part with the head portion of the part in the lower cavity portion and the tail portion of the part in the upper cavity portion of the die cavity to lower the pad and the part below the feed level of the press, the part is extruded in the cavity portions of the die cavity to shape the sides of the head portion and the tail portion of the part, and said head portion of the part is forwardly extruded over the fixed punch and said tail portion of the part is rearwardly extruded over the movable punch to shape recesses in the ends of the part, said lost motion pressure means permitting downward movement of the movable punch with respect to the die to provide the rearward extrusion of the tail portion of the part over the movable punch.

3. The apparatus as defined in claim 1 including a retractable stripper sleeve about the movable punch, and means carried by the ram for advancing the stripper sleeve to strip the extruded part from the movable punch and the cavity in the movable die as the movable punch and movable die are raised by the upward movement of the ram to deposit the extruded part at the feed level of the press.

4. The apparatus as defined in claim 2 including a retractable stripper sleeve about the movable punch, and means carried by the ram for advancing the stripper sleeve to strip the extruded part from the movable punch and the cavity in the movable die as the movable punch and movable die are raised by the upward movement of the ram to deposit the extruded part at the feed level of the press.

5. The apparatus as defined in claim 1 including an ejector sleeve about the stationary punch, which is adapted to extend through the opening in the retractable pad, and means operated in timed relation to the movement of the ram of the press to retract said sleeve to allow the part to be extruded to extend through the opening in the retractable pad into engagement with the fixed punch, and to advance said sleeve to eject the extruded part from the opening in the retractable pad to the feed level of the press.

6. The apparatus as defined in claim 2 including an ejector sleeve about the stationary punch which is adapted to extend through the opening in the retractable pad, and means operated in timed relation to the movement of the ram of the press to retract said sleeve to allow the part to be extruded to extend through the opening in the retractable pad into engagement with the fixed punch, and to advance said sleeve to eject the extruded part from the opening in the retractable pad to the feed level of the press.

7. The apparatus as defined in claim 3 including an ejector sleeve about the stationary punch which is adapted to extend through the opening in the retractable pad, and means operated in timed relation to the movement of the ram of the press to retract said sleeve to allow the part to be extruded to extend through the opening in the retractable pad into engagement with the fixed punch, and to advance said sleeve to eject the extruded part from the opening in the retractable pad to the feed level of the press.

8. The apparatus as defined in claim 4 including an ejector sleeve about the stationary punch which is adapted to extend through the opening in the retractable pad, and means operated in timed relation to the movement of the ram of the press to retract said sleeve to allow the part to be extruded to extend through the opening in the retractable pad into engagement with the fixed punch, and to advance said sleeve to eject the extruded part from the opening in the retractable pad to the feed level of the press.

9. The apparatus as defined in claim 1 wherein said lost motion pressure means includes a cylinder carried by the ram of the press and a pressure-operated piston in the cylinder carrying the movable die.

10. The apparatus as defined in claim 2 wherein said lost motion pressure means includes a cylinder carried by the ram of the press and a pressure-operated piston in the cylinder carrying the movable die.

11. The apparatus as defined in claim 1 including a fixed button carried by the bed of the press below the part feed level thereof, a movable piercing punch fixedly carried by the ram of the press in longitudinal alignment with the fixed button, said feeding means feeding the extruded part along the feed level of the press to a position where the extruded part is in alignment with said fixed button and said movable piercing punch, the apparatus being such that as the ram is lowered the movable piercing punch cooperating with the fixed button pierces the web between the recesses in the ends of the extruded part.

12. The apparatus as defined in claim 2 including a fixed button carried by the bed of the press below the part feed level thereof, a movable piercing punch fixedly carried by the ram of the press in longitudinal alignment with the fixed button, said feeding means feeding the extruded part along the feed level of the press to a position where the extruded part is in alignment with said fixed button and said movable piercing punch, the apparatus being such that as the ram is lowered the movable piercing punch cooperating with the fixed button pierces the web between the recesses in the ends of the extruded part.

13. The apparatus as defined in claim 1 wherein said feeding means for feeding said metal part includes a chute for the part terminating below the feed level of the press, a cylinder-operated block carried by the bed of the press for elevating the part from the chute to the feed level of the press, and a movable punch head movably carried by the ram of the press in longitudinal alignment with cylinder-operated block for resiliently pinching the part as it is elevated by the block to the feed level of the press, said feeding means feeding the metal part along the feed level of the press to said position where the part is in alignment with said die cavity, fixed punch and movable punch.

14. The apparatus as defined in claim 2 wherein said feeding means for feeding said metal part includes a chute for the part terminating below the feed level of the press, a cylinder-operated block carried by the bed of the press for elevating the part from the chute to the feed level of the press, and a movable punch head movably carried by the ram of the press in longitudinal alignment with cylinder-operated block for resiliently pinching the part as it is elevated by the block to the feed level of the press, said feeding means feeding the metal part along the feed level of the press to said position where the part is in alignment with said die cavity, fixed punch and movable punch.

15. The apparatus as defined in claim 11 including a discharge mechanism having a discharge opening at the feed level of the press, said feeding means feeding the extruded and pierced part along the feed level of the press to a position where said part is in alignment with said discharge opening for discharging the extruded and pierced part from the apparatus.

16. The apparatus as defined in claim 12 including a discharge mechanism having a discharge opening at the feed level of the press, said feeding means feeding the extruded and pierced part along the feed level of the press to a position where said part is in alignment with said discharge opening for discharging the extruded and pierced part from the apparatus.

17. An apparatus for use in a press for extruding a double-ended metal extrusion wherein the press has a bed and a ram, comprising, a fixed extrusion punch carried by the bed of the press, a movable extrusion punch fixedly carried by the ram of the press in longitudinal alignment with the fixed punch, a movable die carried by the ram of the press and movable with respect to said ram and having a die cavity in longitudinal alignment with said fixed and movable punches, lost motion pressure means for normally maintaining the die in a downward position with respect to the movable punch, means for feeding a solid metal part to a position where the part is in alignment with the die cavity, where one end of the part is above the fixed punch and the other end of the part is below the movable punch, the apparatus being such that as the ram is lowered, the die encompasses the sides of the part and lowers the part, the part is extruded in the cavity of the die to shape the sides of the part, and said one end of the part is forwardly extruded over the fixed punch and said other end of the part is rearwardly extruded over the movable punch to shape recesses in the ends of the part, said lost motion pressure means permitting downward movement of the movable punch with respect to the die to provide the rearward extrusion of said other end of the part over the movable punch.

18. An apparatus for use in a press for extruding a double-ended metal extrusion from a solid metal part having at one end a head portion of relatively large transverse dimension and at the other end a tail portion of relatively small transverse dimension, and wherein the press has a bed and a ram, comprising, a fixed extrusion punch carried by the bed of the press, a movable extrusion punch fixedly carried by the ram of the press in longitudinal alignment with the fixed punch, a movable die carried by the ram of the press and movable with respect to said ram and having a die cavity in longitudinal alignment with said fixed and movable punches, said die cavity having a lower cavity portion of relatively large transverse dimensions and an upper cavity portion of relatively small transverse dimensions, lost motion pressure means for normally maintaining the die in a downward position with respect to the movable punch, means for feeding said solid metal part with the head portion thereof downwardly to a position where the part is in alignment with the die cavity, where the lower head portion of the part is above the fixed punch and the upper tail portion of the part is below the movable punch, the apparatus being such that as the ram is lowered, the die encompasses the part with the head portion of the part in the lower cavity portion and the tail portion of the part in the upper cavity portion of the die cavity and lowers the part, the part is extruded in the cavity portions of the die cavity to shape the sides of the head portion and the tail portion of the part, and said head portion of the part is forwardly extruded over the fixed punch and said tail portion of the part is rearwardly extruded over the movable punch to shape recesses in the ends of the part, said lost motion pressure means permitting downward movement of the movable punch with respect to the die to provide the rearward extrusion of the tail portion of the part over the movable punch.

19. The apparatus as defined in claim 18 including a fixed button carried by the bed of the press, a movable piercing punch fixedly carried by the ram of the press in longitudinal alignment with the fixed button, and means for feeding the extruded part to a position where the extruded part is in alignment with said fixed button and said movable piercing punch, the apparatus being such that as the ram is lowered the movable piercing punch cooperating with the fixed button pierces the web between the recesses in the ends of the extruded part.

20. The apparatus as defined in claim 19 including a fixed button carried by the bed of the press, a movable piercing punch fixedly carried by the ram of the press in longitudinal alignment with the fixed button, and means for feeding the extruded part to a position where the extruded part is in alignment with said fixed button and said movable piercing punch, the apparatus being such that as the ram is lowered the movable piercing punch cooperating with the fixed button pierces the web between the recesses in the ends of the extruded part.